United States Patent
Donlon

[15] 3,680,488
[45] Aug. 1, 1972

[54] TRANSPORTATION SYSTEM HAVING INERTIAL SWITCH SYSTEM

[72] Inventor: Richard H. Donlon, Denver, Colo.

[73] Assignee: Transportation Technology, Inc., Denver, Colo.

[22] Filed: Sept. 16, 1970

[21] Appl. No.: 72,602

[52] U.S. Cl. ............... 104/130, 104/23 FS, 104/134
[51] Int. Cl. ..................... E01b 25/12, B61b 13/08
[58] Field of Search .......... 46/43, 216; 209/115, 120; 104/23 FS, 148 LM, 60, 130; 273/86 R, 86 B

[56] References Cited

UNITED STATES PATENTS

| | | | |
|---|---|---|---|
| 2,128,848 | 8/1938 | Rafetto | 209/115 |
| 3,098,454 | 7/1963 | Maestrelli | 104/130 |
| 3,500,765 | 3/1970 | Easton | 104/130 |
| 3,593,665 | 7/1971 | Marty | 104/130 |
| 1,335,422 | 3/1920 | Blair | 209/120 |
| 764,478 | 7/1904 | Lewis | 209/120 |
| 3,377,958 | 4/1968 | Bax | 273/86 B |
| 3,290,498 | 12/1966 | Lahr | 273/86 R |
| 3,291,392 | 12/1966 | Cramer | 104/60 |

Primary Examiner—Gerald M. Forlenza
Assistant Examiner—D. W. Keen
Attorney—Barnard, McGlynn & Reising

[57] ABSTRACT

A transportation system particularly suitable for vehicles having omnidirectional suspension system, such as air cushion devices, including a system of paths of travel for the vehicle having a plurality of diverging branch lines and a main line feeding toward the junction of the branch lines. A transition section connects the main line with the branch lines and is operable for directing the vehicle from the main line onto a selected one of the branch lines in accordance with the speed of the vehicle.

9 Claims, 3 Drawing Figures

PATENTED AUG 1 1972  3,680,488

INVENTOR.
Richard H. Dorlon
BY
Bernard, McGlynn & Reising
ATTORNEYS

TRANSPORTATION SYSTEM HAVING INERTIAL SWITCH SYSTEM

This invention relates generally to transportation systems and is particularly concerned with transportation systems including vehicles, pallets or the like for carrying personnel or cargo, and which are supported by air operated levitation devices or other omnidirectional suspension means.

In transportation or article handling systems utilizing vehicles or pallets having omnidirectional suspension means such as the type of air cushion devices disclosed in U. S. Pat. Nos. 3,321,038; 3,357,511 and 3,470,827, the vehicles must generally be stopped in order to switch from one path of travel to another, or elaborate switching apparatus must be provided.

An object of this invention is to provide a transportation system wherein switching of the vehicle from one path or track to another is accomplished by varying the speed of the vehicle as it approaches a junction of two or more diverging paths.

Another object is to provide a transportation system wherein a vehicle is automatically directed onto a selected one of a plurality of diverging paths, tracks or road beds in accordance with the speed of the vehicle.

In carrying out the foregoing, and other objects, a transportation system according to the present invention includes a system of paths, tracks or road beds with diverging branch lines, and a main line that feeds toward the junction of the diverging branch lines. A curved transition section connects the main line with the junction of the branch lines so that centrifugal force acts on a vehicle traveling from the main line over the transition section toward the branch lines. As the speed of the vehicle increases, the vehicle will tend to move toward the outer periphery of the curved transition section due to the action of centrifugal force. With the branch lines diverging from the switch section, the vehicle will move onto a branch line adjacent the inner periphery of the curved transition section at low speeds and will be directed onto a branch line toward the outer periphery of the curved transition section at higher speeds.

The outer peripheral edge of the curved transition section is elevated with respect to the inner peripheral edge so that at low speeds, gravity will maintain the vehicle near the inner peripheral edge of the transition section to direct it on to the appropriate branch line adjacent the inner peripheral edge of the transition section.

A vehicle traveling over the curved transition section is laterally restrained against the action of centrifugal force by a high speed guide rail concentric with the outer peripheral edge of the transition section and is laterally restrained against the action of gravity when traveling at low speeds by a low speed guide rail concentric with the inner peripheral edge of the transition section. The high speed guide rail may comprise a side wall projecting upwardly from the outer peripheral edge of the transition section, and similarly, the low speed guide rail may comprise a side wall projecting upwardly from the inner peripheral edge of the transition section.

Other objects, advantages and features of the invention will become apparent from the following description taken in connection with the accompanying drawings in which.

Figures 1, 2, 3:
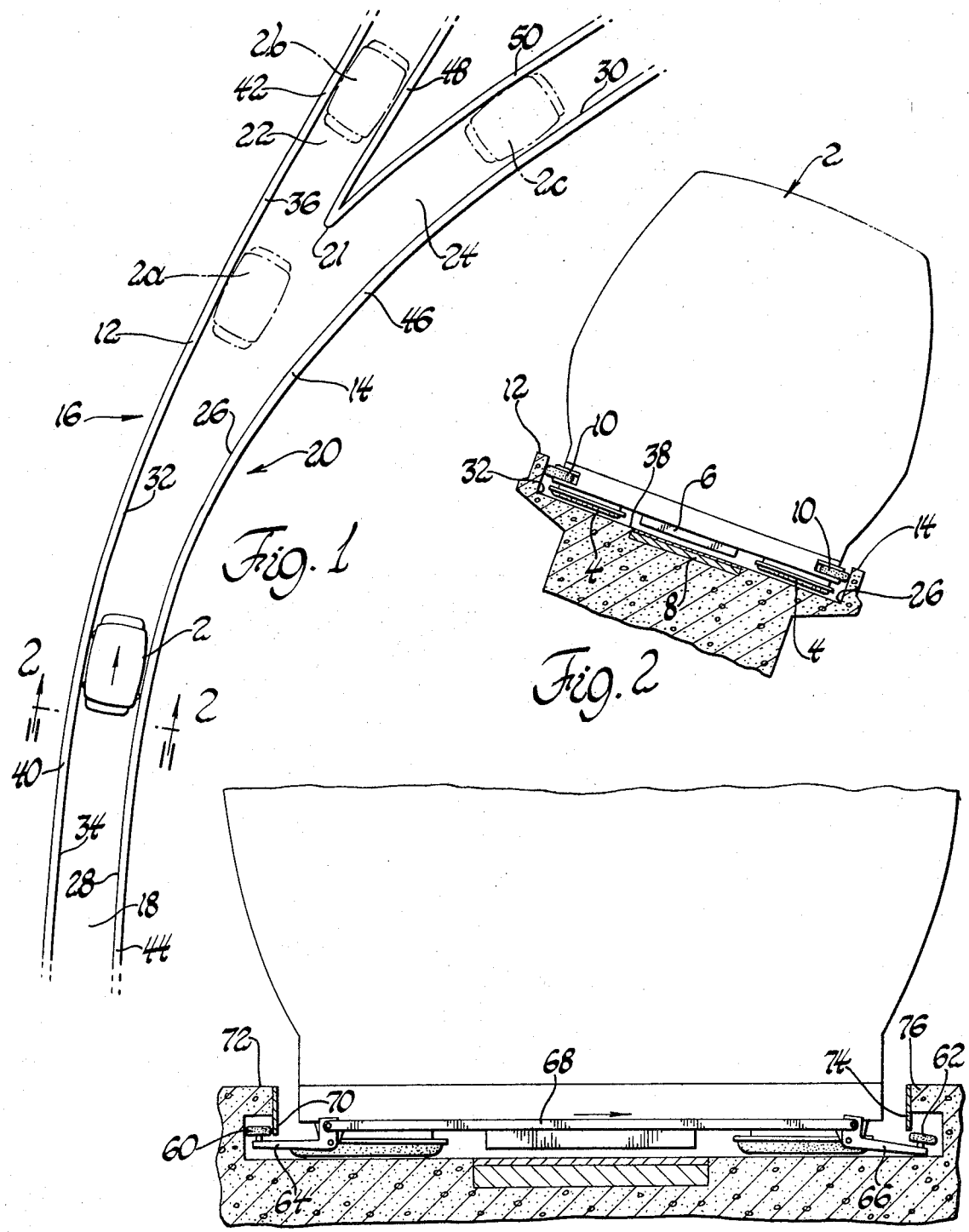
FIG. 1 is a plan view of a transportation system embodying the invention.
FIG. 2 is a sectional view taken on lines 2—2 of FIG. 1.
FIG. 3 is a view similar to FIG. 2 illustrating a modification of the invention.

In the drawings, reference numeral 2 designates a vehicle having omnidirectional suspension means in the form of air cushion devices 4. Vehicle 2 is propelled by a linear electric motor having one element 8 embedded in the surface over which the vehicle travels and the other element 6 carried by the vehicle 2. The linear electric motor or propulsion means may also be of the type disclosed in U.S. Pat. No. 3,357,511. Rollers or buffers 10 are carried by the vehicle 2 as shown in FIG. 2 for engagement with the side rails or walls of the guideway as indicated at 12 and 14 in FIG. 2.

The guideway system is collectively designated by reference numeral 16 in FIG. 1 and includes a main line or path 18 which feeds toward the junction 21 of a pair of diverging branch lines or paths 22 and 24, the main line being connected with the branch lines by a curved transition section or portion designated generally by reference numeral 20. The transition or switch section 20 is curved and has an inner peripheral edge 26 extending from the inner peripheral edge 28 of the main line 18 to the inner peripheral edge 30 of the inner branch line 24. The outer peripheral edge 32 of the transition section 20 connects the peripheral edge 34 of the main line 18 with the outer peripheral edge 36 of the outer branch line 22. As shown in FIG. 2, the outer peripheral edge 32 of the transition section 20 is elevated with respect to the inner peripheral edge 26 such that the vehicle supporting surface 38 of the transition section is inclined downwardly from the outer peripheral edge to the inner peripheral edge.

The side wall or rail 12 of the transition section 20 projects upwardly from the outer peripheral edge 32 and forms a continuation of similar side rails 40 and 42 for the main line 18 and outer branch line 22, respectively. Similarly, the side wall or side rail 14 projects upwardly from the inner peripheral edge 26 of the transition section 20 and forms a continuation of similar side walls 44 and 46 for the main line 18 and outer branch line 24, respectively. The branch lines 22 and 24 may also be provided with side walls 48 and 50, respectively which converge at the junction 21.

As a vehicle moves from the main line 18 onto the transition section 20, gravity will urge the vehicle 2 toward the inner peripheral edge 26 and side rail 14, while centrifugal force on the vehicle will urge the vehicle toward the outer peripheral edge 32 and engagement with side rail 12. The path of travel over the branch lines 22 or 24 can be selected in accordance with the speed of the vehicle. By increasing the speed, the centrifugal force on the vehicle is increased and the vehicle is directed onto the outer branch line 22. The vehicle can be directed onto the inner branch line 24 by holding the speed of the vehicle at a point such that the centrifugal force does not overcome the effects of gravity on the vehicle so that the vehicle follows the inner side rail 14 onto the inner branch line 24. The sequential position of the vehicle 2 at high speed is illustrated in phantom lines at 2a and 2b in FIG. 1, and the vehicle traveling at low speed onto branch 24 is illustrated in phantom lines at 2c.

FIG. 3 illustrates a back-up safety device which may be desirable for passenger vehicles in the system in the event that the vehicle attains an incorrect speed for directing it onto either branch line due to a power failure or the like when the side walls 48 and 50 are present. Rollers or followers 60 and 62 are respectively mounted on the ends of bell crank levers 64 and 66 pivotally mounted on the vehicle. The bell crank levers 64 and 66 are pivotally connected together by a cross-link 68. In the position shown in FIG. 3, roller 60 is received between the side rail and a plate member 70 mounted on the inner edge of an overhang or inwardly projecting flange 72. Roller 62 is in a lowered, inactive position to permit the vehicle to move away from the right hand side rail of FIG. 3. By shifting the cross-link 68 to the left, roller 60 will drop out of engagement with plate 70 and roller 62 will be raised into the active position to be received between a plate 74 mounted on the overhang 76 and the right hand side rail. Plates 70 and 74 together with the overhang portions 72 and 76 define grooves for retaining the active roller 60 and 62.

The drawings thus illustrate a transportation system comprising a vehicle 2, a system of paths of travel designated generally by reference numeral 16 and comprising a plurality of diverging branch lines 22 and 24 and a main line 18 feeding toward the junction 21 of the branch lines. Means 20 in the form of a curved transition section directs the vehicle from the main line onto a selected one of the branch lines in accordance with the speed of the vehicle 2. The branch lines include an outer branch line 22 extending from the transition section 20 adjacent the outer peripheral edge 32 of the transition section, and an inner branch line 24 extending from the transition section 20 adjacent the inner peripheral edge 26 of the transition section, the outer peripheral edge 32 being elevated with respect to the inner peripheral edge 26. Means 12, 14 laterally restrain the vehicle against the action of centrifugal force when the vehicle travels at high speeds over the transition section and restrains the vehicle against the action of gravity when the vehicle travels at low speeds over the transition section 20. The lateral restraining means is in the form of a high speed guide rail 12 which is concentric with the outer peripheral edge of the transition section that is engageable by the vehicle at high speeds. The high speed guide rail 12 in the illustrated embodiment is in the form of a side wall projecting upwardly from the outer peripheral edge of the transition section. The lateral restraining means further comprises a low speed guide rail concentric with the inner peripheral edge 26 of the transition section 20 and is engageable by the vehicle at low speeds, the low speed guide rail in the illustrated embodiment being in the form of a side wall 14 projecting upwardly from the inner peripheral edge 26 of the transition section.

While a specific form of the invention is illustrated and described in the accompanying drawings and foregoing specification it should be understood that the invention is not limited to the exact construction shown. Various alterations in the construction and arrangement, all falling within the scope and spirit of the invention, will be apparent to those skilled in the art.

I claim:

1. A transportation system comprising: a vehicle; a system of paths of travel for said vehicle comprising a plurality of diverging branch lines and a main line feeding toward the junction of said branch lines; and means for directing said vehicle from said main line onto a selected one of said branch lines in accordance with the speed of the vehicle; said means comprising a curved route transition section connecting said main line with said branch line; said plurality of branch lines includes an outer branch line extending from said transition section adjacent the outer peripheral edge of said transition section and an inner branch line extending from said transition section adjacent the inner peripheral edge of said transition section; the outer peripheral edge of said transition section being elevated with respect to the inner peripheral edge thereof; further including means for laterally restraining said vehicle against the action of centrifugal force when said vehicle travels at high speeds over said transition section and for laterally restraining said vehicle against the action of gravity when said vehicle travels at low speeds over said transition section; said last named means comprising a high speed guide rail concentric with the outer peripheral edge of said transition section and engageable by said vehicle at high speeds and a low speed guide rail concentric with the inner peripheral edge of said transition section and engageable by said vehicle at low speeds; said high speed guide rail comprising a side wall projecting upwardly from the outer peripheral edge of said transition section, and said low speed guide rail comprising a side wall projecting upwardly from the inner peripheral edge of said transition section.

2. A transportation system as claimed in claim 1 including air cushion suspension means for said vehicle.

3. A transportation system as claimed in claim 2 wherein said vehicle is propelled by a linear electric motor.

4. A transportation system as claimed in claim 3 wherein the primary of said linear motor is embedded in the surface of said system of paths and the secondary is carried by said vehicle.

5. A transportation system comprising: a vehicle; omnidirectional suspension means for said vehicle; a system of paths of travel for said vehicle including inner and outer diverging branch lines, a main line feeding toward the junction of said branch line, and a curved transition section connecting said main line with said branch lines; the outer peripheral edge of said transition section being raised with respect to the inner peripheral edge; said inner branch line extending from said transition section adjacent said inner peripheral edge and said outer branch line extending from said transition section adjacent said outer peripheral edge; a high speed guide rail concentric with said outer peripheral edge and engageable by said vehicle traveling at high speeds to guide the vehicle onto said outer branch line; and a low speed guide rail engageable by said vehicle traveling at low speeds to guide the vehicle onto said inner branch line.

6. A guideway system as claimed in claim 5 wherein said omnidirectional suspension means comprises at least one air operated levitation device.

7. A guideway system as claimed in claim 6 wherein said vehicle is propelled by a linear electric motor, one element of which is embedded in said system of paths and the other element of which is carried by said vehicle.

8. A transportation system comprising: a vehicle having omnidirectional suspension means; a guideway system for said vehicle including a main line having a vehicle supporting surface and a pair of spaced parallel side walls for laterally restraining the vehicle, a pair of diverging branch lines each having a vehicle supporting surface, a pair of spaced parallel side walls for laterally restraining the vehicle, and a curved transition section connecting said main line with said branch line; said transition section having a vehicle supporting surface and a pair of spaced side walls diverging from the side walls of said main line for laterally restraining the vehicle, the outer said wall of said transition section connecting with the outer side wall of one of said branch lines and the inner side wall of said transition section connecting with the outer side wall of the other branch line; the vehicle supporting surface of said transition section being inclined downwardly from its outer peripheral edge to its inner peripheral edge, and the inner side walls of said branch lines converging at the junction of said branch lines.

9. A guideway system as claimed in claim 8 including means defining a retaining groove on each of the side walls; and a pair of followers selectively and alternately engageable with a respective one of the grooves to restrain the vehicle against movement from the associated sidewall.

* * * * *